United States Patent
Biondi

(10) Patent No.: US 6,904,839 B2
(45) Date of Patent: Jun. 14, 2005

(54) OLEOPNEUMATIC ACTUATOR CYLINDER DEVICE FOR THE ALIGNMENT IN RECTILINEAR DRIVE OF STEERING OR SELF-STEERING AXLES OF VEHICLES

(76) Inventor: Armando Biondi, Via della Pace, 24, I-40010 Sala Bolognese (IT)

(*) Notice: Subject to any disclaimer, the term of this patent is extended or adjusted under 35 U.S.C. 154(b) by 53 days.

(21) Appl. No.: 10/415,576

(22) PCT Filed: Oct. 30, 2001

(86) PCT No.: PCT/IT01/00550

§ 371 (c)(1),
(2), (4) Date: Apr. 30, 2003

(87) PCT Pub. No.: WO02/36413

PCT Pub. Date: May 10, 2002

(65) Prior Publication Data

US 2004/0100065 A1 May 27, 2004

(30) Foreign Application Priority Data

Oct. 31, 2000 (IT) .................................... VR2000A0109

(51) Int. Cl.$^7$ ............................................. F15B 11/072
(52) U.S. Cl. ........................ 91/4 R; 91/255; 91/417 R; 60/403
(58) Field of Search ............................. 91/4 R, 417 R, 91/255, 321; 60/405, 403

(56) References Cited

U.S. PATENT DOCUMENTS

| 2,962,001 | A | * | 11/1960 | Morton et al. ................. 91/398 |
| 3,176,801 | A | * | 4/1965 | Huff ........................... 188/313 |
| 4,343,225 | A | * | 8/1982 | Runkle et al. .................. 91/52 |

FOREIGN PATENT DOCUMENTS

| EP | 0 477 816 A2 | 4/1992 |
| EP | 0 786 394 A | 7/1997 |

* cited by examiner

*Primary Examiner*—Edward K. Look
*Assistant Examiner*—Igor Kershteyn
(74) *Attorney, Agent, or Firm*—Charles Barman, Esq.; Greenberg Traurig, LLP

(57) ABSTRACT

An oleopneumatic actuator cylinder device for steering and self-centering for the alignment to a straight drive of steering or self-steering axles, in particular for rear axles of vehicles, is constituted by a single oleopneumatic actuator cylinder for each rear steering axles. The actuator cylinder comprises a pneumatic sector communicating with a respective pneumatic circuit, an oleodynamic sector communicating with a respective oleodynamic circuit, a stem kinetically connected to the a mechanical driving element to move the wheels of the vehicle, and a central body that delimits the pneumatic sector and the oleodynamic sector.

9 Claims, 4 Drawing Sheets

OLEOPNEUMATIC ACTUATOR CYLINDER DEVICE FOR THE ALIGNMENT IN RECTILINEAR DRIVE OF STEERING OR SELF-STEERING AXLES OF VEHICLES

TECHNICAL FIELD

The present invention relates to a rotation and autocentering control device for the alignment in rectilinear drive of steering or self-steering axles of vehicles, in particular of rear axles.

More particularly, the present invention relates to a oleopneumatic device, comprising a structure such that it is possible to use said device for the rotation control and for the alignment of one or more steering rear axles of heavy vehicles.

The invention finds a particularly suitable application in the field of mechanical industry, agriculture and transportation.

BACKGROUND ART

It is known that an heavy vehicle can have steering rear axles to allow an easier manoeuverability especially when the working in narrow spaces is required.

At present the steering rear axles are usually controlled by oleodynamic or oleopneumatic devices which can be connected to a speedometer providing the action of a mechanical stop when the speed exceeds a fixed value. The speedometer is usually connectable to an electronic system which provides to send the signals both to the possible oleopneumatic device and to the mechanical stop.

More particularly, to obtain the centering of the rear axles by means of a cinematic connection of the same to an oleodynamic cylinder, nowadays solutions are applied where such cylinder is hydraulically controlled while its own respective stem is positioned through the action of sensing transducers electrically connected to an electronic system. In this case the placing of the stem does not require the presence of any fixed reference mechanical abutments.

According to an other solution the stem of the oleodynamic cylinder is positioned in middle stroke only by means of mechanical devices using a double pneumatic or oleodynamic cylinder external to the said first cylinder and connected thereto by means of any suitable cinematic chain.

A further solution comprises the positioning of the stem always by means of mechanical devices but with a double oleodynamic cylinder incorporated in said first cylinder.

These latter solutions comprise fixed mechanical abutments as reference and, when the stem reaches the predefined centering position for the axles, the oleodynamic feeding circuit of the cylinder is switched to a by-pass position.

DESCRIPTION OF THE INVENTION

The present invention aims to provide for a self-centering device for the alignment of steering or self-steering axles which is able to use the compressed air which is normally comprised in the systems inside the truck, and to feed it inside the operating oleodynamic cylinder to obtain the mechanical auto-centering of the axles cinematically connected to the stem of said operating oleodynamic system.

Furthermore, the present inventions aims to provide a self-centering device for the alignment of steering and auto-steering axles comprising a single operating oleopneumatic cylinder intended at the same time for the manoeuvering of the axles and for the centering of the same, avoiding the use of other elements which would cause the device itself more cumbersome, complex and expensive.

A further aim of the present invention is to propose a safe and reliable autocentering device in a way that, in case of break or failure of the oleodynamic steering system, the wheels of the rear axles become aligned to the driving direction of the vehicle in order to avoid dangerous skids of the same.

A further aim of the present invention is to provide a device comprising an operating cylinder for rotational control and for autocentering usable for both steering axles with mechanical control and for axles with respectively electro-mechanical and electronic control.

The device according to the invention comprises, for each respective rear steering, a single oleopneumatic operating cylinder comprising a sector communicating with a corresponding pneumatic circuit and a sector communicating with a corresponding oleodynamic circuit, said cylinder being cinematically connected, by means of the external end of the stem, to any suitable mechanical working element intended for the manoeuvering of the wheels of said axle.

According to the invention the pneumatic sector of the operating oleopneumatic cylinder is subdivided by means of a fixed abutment or flange into two chambers, each of them being suitable for containing a first floating piston, at the internal end of the stem, said fist piston being free to move from a chamber to the other one, as well as a second piston that is fixed to the stem.

The floating pistons comprise control elements which, in aligned conditions of the steering rear axle wheels, are suitable for aligning the piston in relation to the flange or fixed abutment.

The oleodynamic sector is subdivided into two chambers by a piston connected to the stem in a suitable intermediate position.

The pneumatic sector is divided from the oleodynamic one by means of a central body provided, besides of connections for the fluid entry, with at least a hole to discharge oil, condensate and air.

ILLUSTRATION OF DRAWINGS

Other features and advantages of the present invention will become apparent from reading the following description of some forms of embodiment of the invention, given as non-limiting examples, with reference to the drawings shown in the annexed sheets, where:

DESCRIPTION OF A FORM OF EMBODIMENT

Figure 1:
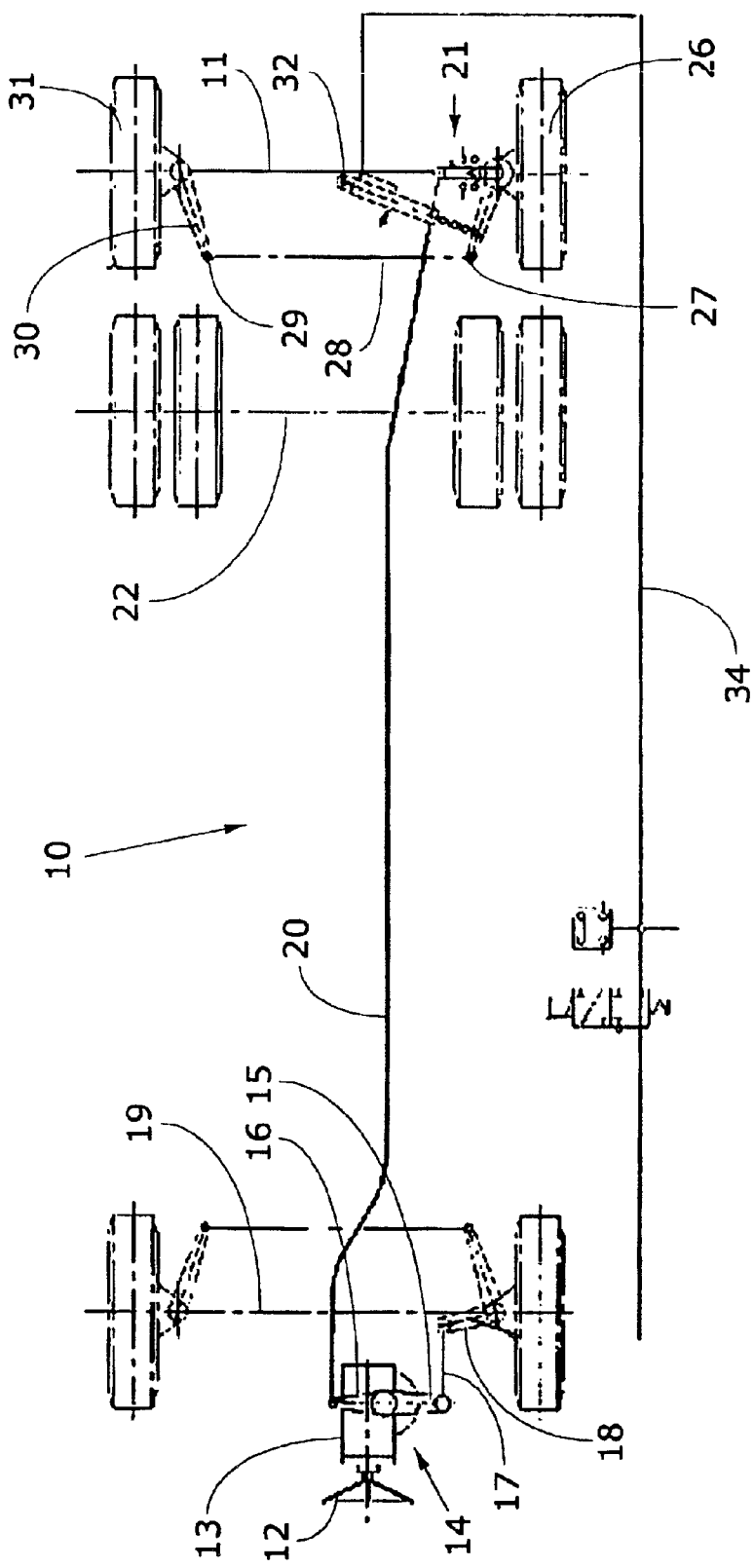
FIG. 1 is a schematic plan view of a vehicle with a device according to the invention.

As shown in FIG. 1, reference numeral 10 generally indicates, and in a schematic way, a heavy vehicle comprising a steering rear axle 11.

Vehicle 10 comprises, for the part related to the shown simplified scheme, a steering wheel 12 cinematically connected to a box for the steering system 13 assigned to the control of a lever system 14 formed by two opposed arms 15 and 16 in respect of a common pivot. The arm 15 is suitable, by means of a connecting stem 17, for dragging a lever 18 cinematically connected to the rear axle 19 of the vehicle 10, while the arm 16 is assigned by means of a control cable 20, for example a Bowden cable, to move a steering device 21 for the steering rear axle 11, while the other rear axle 22 is fixed.

Figure 2:
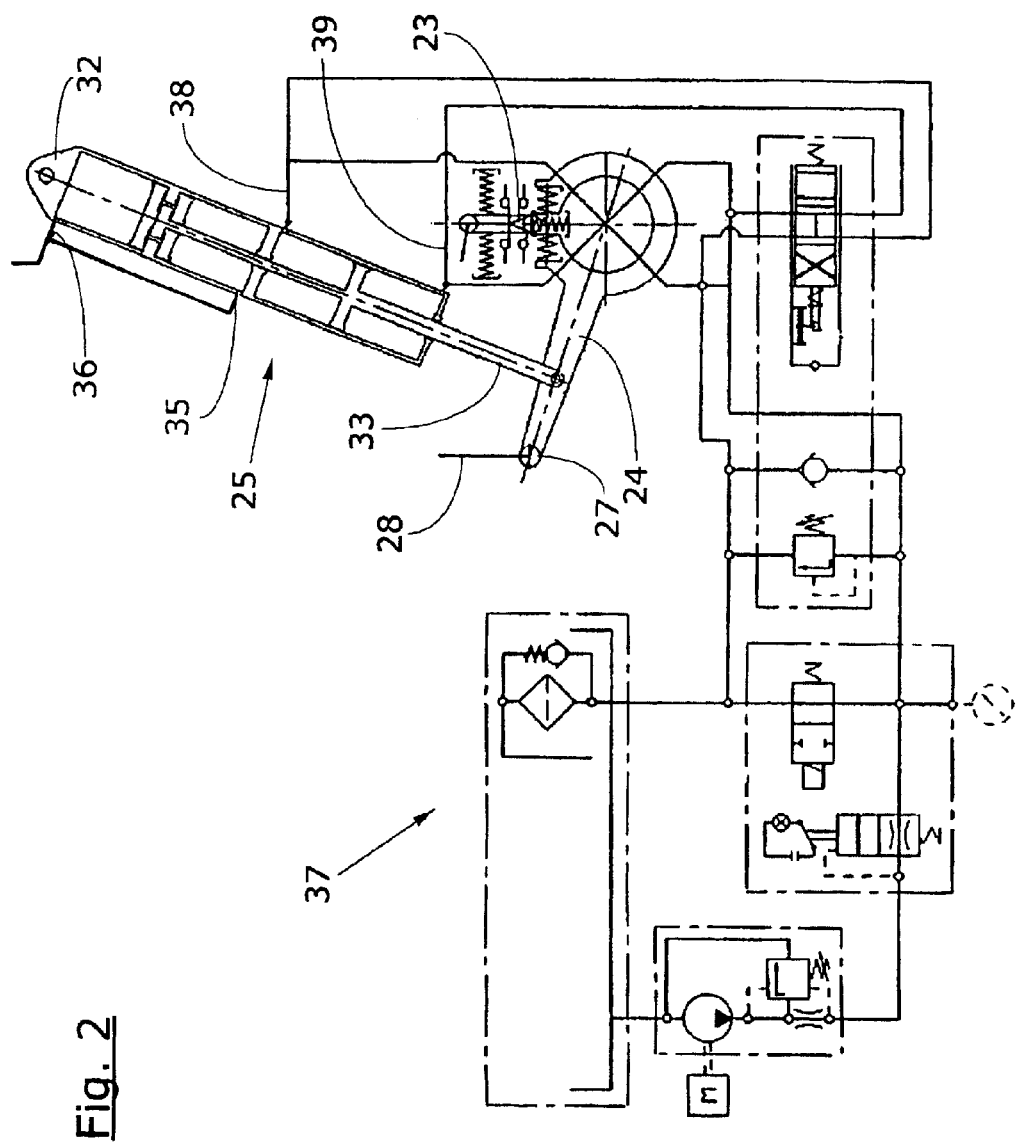
FIG. 2 shows a schematic plan view, in an enlarged scale, of a oleodynamic circuit connected to the oleopneumatic operating cylinder.

With reference to FIG. 2, it can be noted that device 21 comprises a lever system 23 comprising a lever 24 that is movable by a respective oleopneumatic operating cylinder 25 assigned both to control functions and to auto-centering and safety for the steering of the axle 11. Lever 24 is assigned to the rotation of the rear wheel 26 and its jutting end 27 is connected by means of a rigid bar 28, to the relative jutting end 29 of a second lever 30 assigned to the rotation of the wheel 31 belonging to the same rear axle 11.

The oleopneumatic operating cylinder 25 comprises a hinge connection 32 to the axle body 11 and a movable stem 33, that protrudes by the opposed longitudinal side in respect of connection 32, which end is fixed to lever 24.

The operating cylinder 25 is pneumatically connected to a compressed air system 34 of the vehicle 10 by means of pipes 35 and 36, it is further oleodynamically connected to an oil distribution system 37 under pressure by means of pipes 38 and 39.

Figure 3:
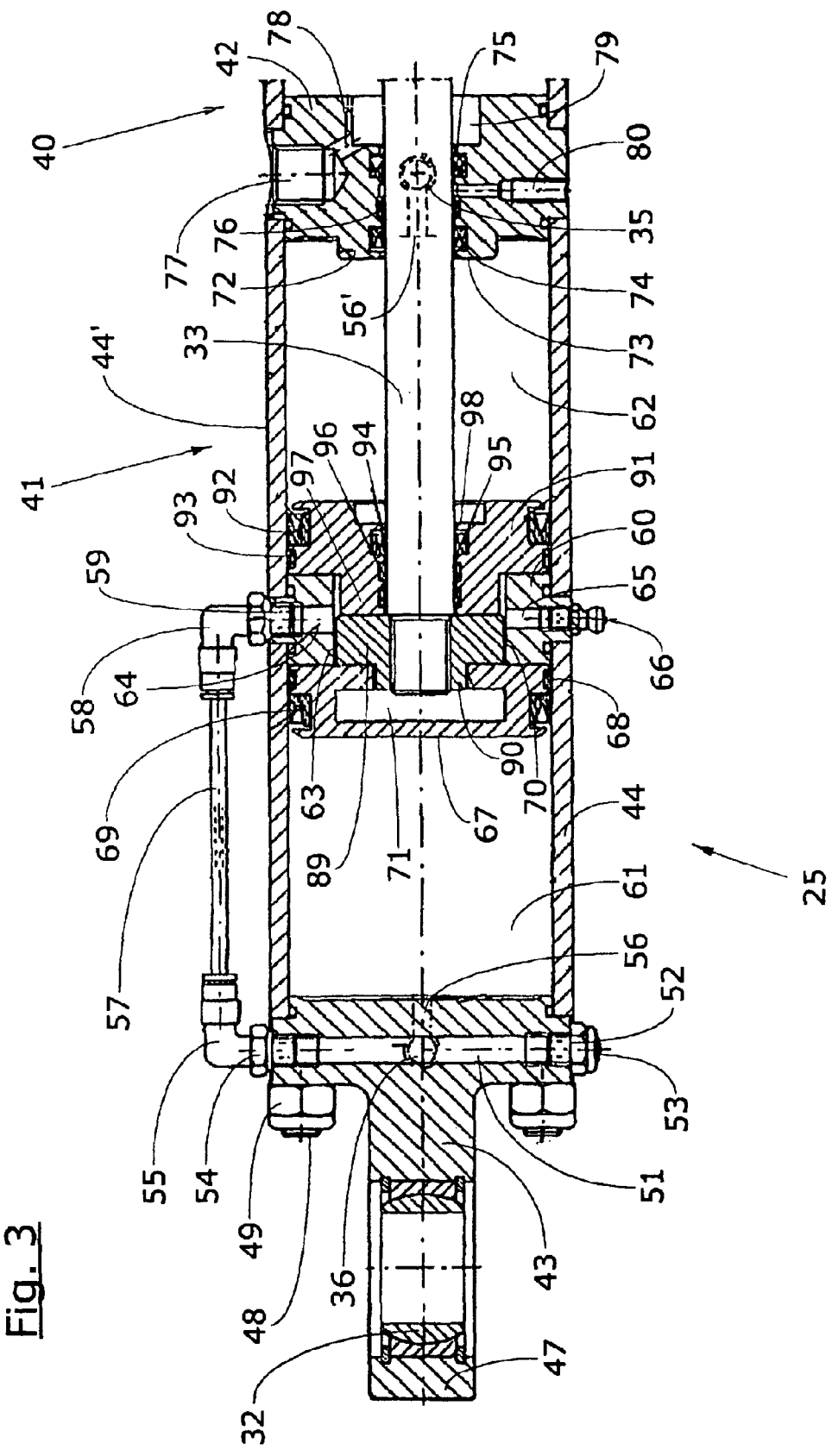
FIG. 3 illustrates a partial view in longitudinal cross-section, in an enlarged scale, of the pneumatic sector of the operating cylinder.
Figure 4:
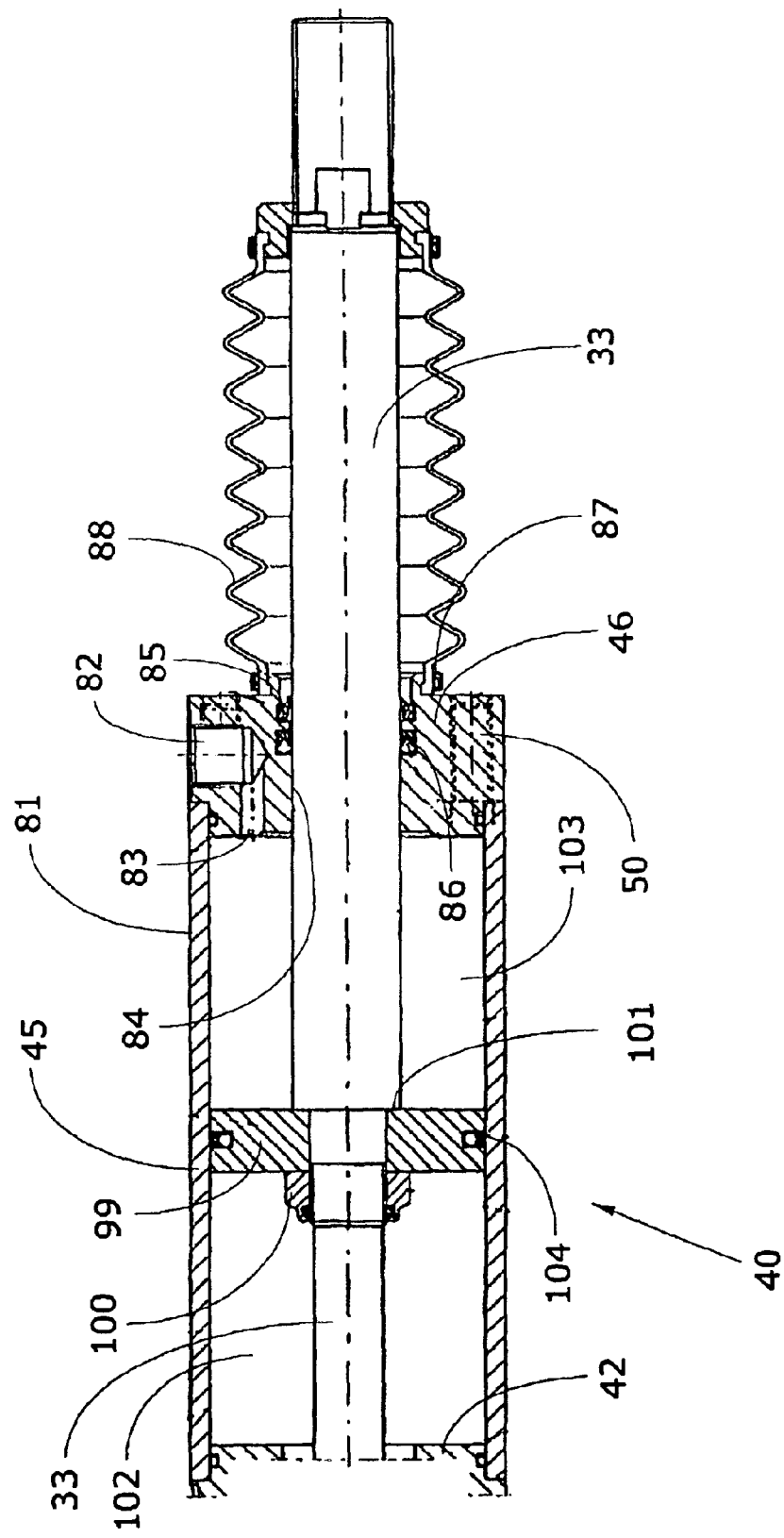
FIG. 4 is a partial view in longitudinal cross-section, in an enlarged scale, of the oleodynamic sector of the operating cylinder.

With reference to FIGS. 3 and 4, it can been seen that the oleopneumatic operating cylinder 25 comprises two sectors 40 and 41 delimited by a fixed central body 42 and respectively dedicated to the use of oil and air under pressure.

The sector 41 is delimited by a bottom base 43, two sleeves or tubes 44, 44', a flange 60 and a central fixed body 42, while the sector 40 comprises the same fixed body 42, a sleeve or tube 45 and a head 46. The two sectors 40 and 41 are aligned to each other and placed in such a way that sleeves 44 and 45 are separated from each other, in order to achieve an operating cylinder 25 with a compact configuration and suitable the reciprocating movement of the single stem 33.

The base 43 is provided of a eyelet 47 which is integral with it and suitable for receiving the hinge connection 32. Both the base 43 and the head 46 can be fixed to the respective sleeves 44 and 45 through any suitable kind of connecting means, for example with some tie rods 48, placed on the outer skirt of cylinder 25 and tightened by respective nuts 49 jutting out in correspondence of bottom base 43 and screwed into respective nut screws 50 of head 46.

Bottom base 43 is radially crossed by a hole 51 which defines an opening 52 to the outside occupied by an air filter 53 and a second opening 54, diametrically opposed to the first one, having a junction 55 connecting hole 51 to the inside of sector 41. Bottom base 43 comprises a further orifice 56 substantially at right angles in respect of hole 51 and directly connected to pipeline 36 for the inlet of pressurized air coming from the circuit 34. Junction 55 is joined to an interconnecting pipe 57 at which end there is a further joint 58 that is mounted on a respective opening 59 placed on the fixed abutment 60 which is positioned in correspondence of the central portion of sector 41. The fixed abutment 60 divides the sector 41 into a left chamber 61 next to bottm base 43, and a right chamber 62 next to central body 42. The fixed abutment 60 comprises a flange which internal portion 63 communicates with opening 59 through a radial aperture 64. Flange 60 further comprises a radial hole 65, substantially opposed to the aperture 64, communicating with the outside and suitable for housing a lubricator 66.

Inside the left chamber 61 is movably placed a left floating piston 67 provided of a guiding ring 68 and of a sealing gasket 69 both in contact with the inner surface of sleeve 44. The left floating piston 67 comprises, on its frontal surface facing the flange 60, an opening 70 to access to an inner cavity 71 thereof.

The central fixed body 42 has a cylindrical configuration with the frontal surface directed to the flange 60 comprising an annular portion 72 with a larger thickness. Central body 42 is crossed, in correspondence of its axis, by a hole 73 whose lateral surface comprises seats for the respective sealing gaskets 74, 75 and for a guiding ring 76.

In particular sealing gasket 74 for gases is next to the right chamber 62, sealing gasket for liquids 75 is close to sector 40 and guiding ring 76 is interposed between the two gaskets 74 and 75. The central body 42 further comprises a screwed connection 77, for a respective junction of the tube 38 which is connected, through hole 78, to a widened part of hole 73 which is directed to the sector 40. Substantially, on a side that is diametrically opposed to the connection 77, the central body 42 comprises a radial hole 80 connecting the axial hole 73 with the outside to discharge air, condensate and oil.

Moreover the central body 42 comprises a further hole 56' substantially orthogonal to connection 77, directly connected to a pipe 35 for injecting compressed air coming from circuit 34.

Sector 40 is constituted by a tube 81 longitudinally defined by a central body 42 and, on the opposite side, by head 46. The latter is provided of a screwed connection 82 for the insertion of a respective junction of pipeline 39. Connection 82 communicates with the inside of sector 40 through an aperture 83.

Head 46 comprises an axial through hole 84 which lateral surface, from the outside to the inside of operating cylinder 25, has a seat for a scraping ring 85 and a seat for a respective sealing gasket for liquids 86.

The head 46 further comprises, on its own frontal surface directed to the outside of the operating cylinder 25, a jutting ring 87 surrounding the axial hole 84 and intended as connecting means for a protection insert 88 of stem 33.

Inside of operating cylinder 25, a longitudinal end of stem 33 is connected, for example by means of a screw cutting, to a piston 89 that is suitable for moving inside of either the left chamber 61 or the right one 62 passing through the internal portion 63 of flange 60. Piston 89 comprises, in correspondence of the end of stem 33, a narrower portion 90 intended, in use, to be placed inside the opening 70 of the left floating piston 67.

Inside the right chamber 62 there is a right floating piston 91 comprising a seat for a sealing gasket for gases 92 and a seat for a guiding ring 93 both in contact with the inner surface of sleeve 44'. Piston 91 is crossed by an axial through hole 94 on which lateral surface there are seats for a gas sealing gasket 95 and for guiding rings 96; furthermore it comprises an annular protuberance 97 and a widened portion 98 of hole 94 which in use are respectively directed to the flange 60 and to the central body 42.

In use, stem 33 crosses hole 94 of the right floating piston 91, the axial hole 73 of the central body 42 and the hole 84 of the head 46. The portion of the stem 33 comprised in the sector 40 is connected to an intermediate piston 99 fixed to the same stem 33 by any kind of mechanical means, for example by means of a screwed ring nut 100 pushing against the piston 99 abuting against a stop 101.

The intermediate piston 99 divides the sector 40 into a left front chamber 102 and a right front chamber 103 which do not hydraulically interact thanks to the presence of a sealing gasket for liquids 104 housed in a respective seat of the same piston 99.

The stem 33 shown in the figures is centered in such a way that the wheels 26 and the axle 11 are aligned to the remaining non-steering wheel of the vehicle 10. The steering wheel rotation 12 causes, by means of the control cable 20, the activation of the oleodynamic circuit 37 which provides to the injection of oil into the operating cylinder 25. In the case where the oil is introduced by means of the pipe 38, it flows down under pressure inside the left front chamber 102 of sector 40 passing through the screwed connection 77 and the hole 78. Such condition causes an ouwardly directed movement of the stem 33 from the operating cylinder 25 with a resulting counterclockwise rotation of wheels 26 and 31. In this case piston 89 drives the right floating piston 91 to the central body 42 until, like an end-stroke if maximal steering is needed, the widened portion 98 receives the annular protuberance 72.

In the case where the oil is introduced through pipe 39, it flows down under pressure inside the front right chamber 103 of the sector 40 passing through the screwed connection 82 and the hole 83. Such condition causes the return of the stem 33 to the operating cylinder 25 with the resulting clockwise rotation of wheels 26 and 31. In this case piston 89 is brought back to flange 60 which is eventually overtaken, and drives the left floating piston 67 to the base 43 while, if the maximal steering is needed, the ring nut 100 is received inside the widened portion 79. In these cases the thrust on the intermediate piston 99 performed by the pressure of the oil overcomes the thrust performed on the floating pistons 67 and 91 by the pressure of the air contained in the chambers 61 and 62, and such pneumatic thrust acts in favour when the stem from the end moves to the centered position, and against when the stem moves from the centered position to the end.

In the case where the oil contained within sector 40 is not under pressure, owingto a failure of the oleodynamic circuit 37 or the breakdown of one of its components, the pressure applied by the air on the left floating piston 67 and the right floating piston 91 is such as to bring back the same floating pistons close to the flange 60 acting as fixed abutment, thereby aligning piston 89 and consequently stem 33 and wheels 26, 31 to a position of straight drive.

In this way the oleopneumatic operating cylinder 25 can provide both the manoeuvering of wheels 26, 31 of the steering axle 11 and the safety of an self-centering action of the same wheels 26 and 31 in the case of a failure of the oleodynamic circuit 37.

The invention has previously been described with reference to a preferred form of embodiment of the same.

However it is clear that the present invention is susceptible to several modifications and variations within the scope of the present invention.

By way of example it is clear that, keeping the same functional principle, the components of the invention can have different shape and dimensions from those reported in the figures.

Moreover it is clear that the invention is not limited to the application previously described, such as a safety and centering device of the rear axles of heavy vehicle; it is, on the contrary, suitable for being used in different oleopneumatic application, in the field of the mechanical, agricultural and transport industries.

What is claimed is:

1. An oleopneumatic actuator cylinder device for steering and self-centering axles having wheels thereon, comprising:
   a stem located inside the oleopneumatic actuator cylinder device and emerging out of a top base of the oleopneumatic actuator cylinder device, the stem being kinetically connected to a mechanical driving element suitable for moving the wheels of said steering and self-centering axles in a vehicle;
   a pneumatic sector located next to a bottom base of the oleopneumatic actuator cylinder device and dedicated to the use of air under pressure, the pneumatic sector communicating with a respective pneumatic circuit, wherein the pneumatic sector is subdivided by a fixed abutment into two chambers, each chamber being suitable for hosting a floating piston as well as a second piston, the second piston being fixed to an inner end of the stem and being free to move from one said chamber to the other chamber;
   an oleodynamic sector located next to the top base of the oleopneumatic actuator cylinder device and communicating with an oleodynamic circuit; the oleodynamic sector dedicated to the use of oil under pressure; the oleodynamic sector including an intermediate piston fixed to said stem; and
   a central body delimiting the pneumatic sector and the oleodynamic sector.

2. The oleopneumatic actuator cylinder device of claim 1, wherein said floating piston is submitted to a predetermined pressure generated by a pneumatic system of the vehicle, the floating pision comprising abutment elements suitable to align said second piston to said fixed abutment whereby the second piston abuts against said fixed abutment in order to obtain a rectilinear driving condition of the wheels of the steering and self-centering axle, thereby assuring a safety condition in case of breakdown of the oleodynamic circuit.

3. The oleopneumatic actuator cylinder device of claim 2, wherein the predetermined pressure ranges between seven to ten bar.

4. The oleopneumatic actuator cylinder device of claim 1, wherein said floating piston comprises, on a frontal surface facing said fixed abutment, an opening for accession to an inner cavity thereof.

5. The oleopneumatic actuator cylinder device of claim 4, wherein said piston comprises, in correspondence to an end of said stem, a narrower portion which, in use, is suitable for being placed inside said opening of the floating piston placed within one of the two chambers.

6. The oleopneumatic actuator cylinder device of claim 1, wherein said floating piston placed inside said chamber comprises an annular protuberance which, in use, is placed towards said fixed abutment, and a widened portion of an axial through hole which, in use, is placed towards said central body.

7. The oleopneumatic actuator cylinder device of claim 6, wherein said stem comprises, in correspondence with said intermediate piston, a ring nut that faces said central body and that is suitable for being inserted, in use, within said widened portion.

8. The oleopneumatic actuator cylinder device of claim 1, wherein said actuator cylinder comprises a bottom base radially crossed by a hole which defines an aperture to the outside in which an air filter is placed, and a second opening that comprises a junction joined to an interconnecting pipe that terminates in in correspondence of said fixed abutment.

9. The oleopneumatic actuator cylinder device of claim 8, wherein said fixed abutment comprises a lubricator substantially opposed to said interconnecting pipe.

* * * * *